Aug. 17, 1954     E. S. DANCEY     2,686,362
CABLE CUTTING TOOL
Filed Sept. 17, 1951

INVENTOR.
EDGAR S. DANCEY
BY
*Whittemore Hulbert & Belknap*
ATTORNEYS

Patented Aug. 17, 1954

2,686,362

UNITED STATES PATENT OFFICE 2,686,362

CABLE CUTTING TOOL

Edgar S. Dancey, Detroit, Mich.

Application September 17, 1951, Serial No. 246,909

1 Claim. (Cl. 30—95)

The invention relates to cable cutting tools more particularly designed for use by electricians for the cutting and removal of electrical conductor cables from installations. It is frequently the case that electrical conductor cables when installed in electric pull boxes, raceways, around switchboards and other types of electrical equipment, are in such close proximity to a wall or other structure as to preclude severing of the same by a cable cutter of the usual construction.

It is therefore the object of my invention to obtain a construction which can be easily engaged with the cable in such situations and operated to sever the same so as to facilitate its removal. This is necessary when the electrical load has been so increased that the original conductors cannot safely carry the same and must be replaced by heavier duty cables.

The invention therefore consists in the construction as hereinafter set forth.

Figure 3:
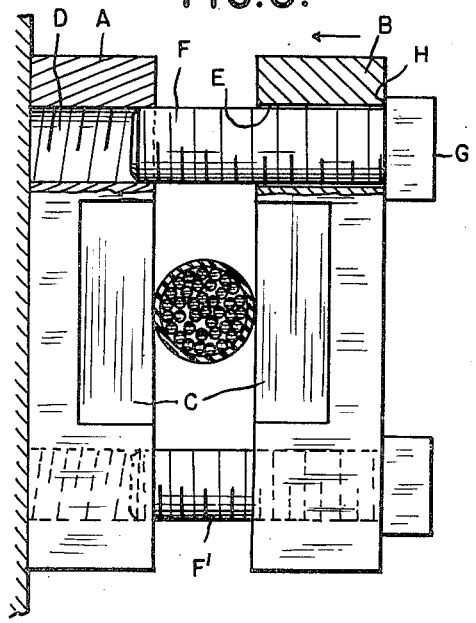
Fig. 3 is a cross-section partly in elevation on line 3—3, Fig. 2.
Figure 2:
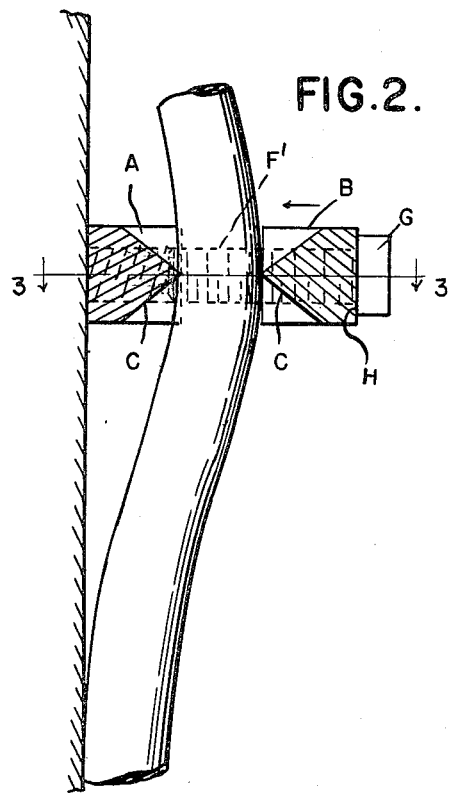
Fig. 2 is a cross-section through the tool as applied to a cable for the severance of the same.
Figure 1:
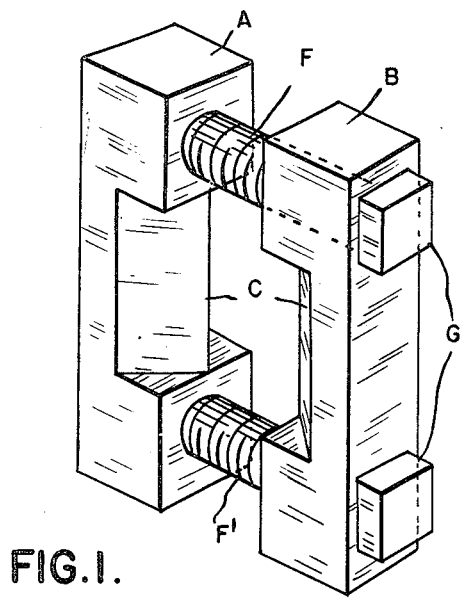
Fig. 1 is a perspective view of the tool detached.
Figure 4:
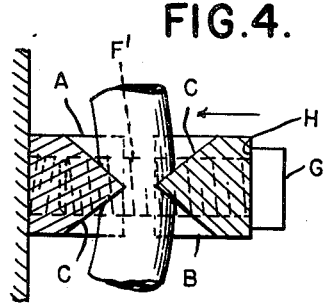
Fig. 4 is a section similar to Fig. 2 showing the cable as nearly severed.

My tool comprises two bar jaw members A and B formed with V-shaped sections C in a portion of the length thereof forming opposed cutters. The bars project beyond the V-shaped section thereof and have registering apertures D and E therethrough for a clamping screw F, which has a threaded engagement with the aperture D in the bar A. Preferably the bars are provided with oppositely projecting end portions with clamping screws F and F' engaging the respective ends. The screws F and F' have polygonal heads G forming shoulders H bearing against the bar B.

With the construction as described the bar A when detached can be inserted endwise between the cable and any wall or structure adjacent thereto. This is readily accomplished by prying the cable a sufficient distance away from the wall for such insertion. The bar B is then placed on the opposite side of the cable and the screws F and F' engaged therewith and with the threaded apertures D. By then turning the screws through the polygonal heads G the V-shaped sections will be forced through the cable to sever the same.

The construction is an exceedingly simple one and inexpensive to manufacture, as the jaw elements A and B can be readily formed from bar stock which is milled or otherwise cut to form the V-cross-sectional portion and bored and tapped for engagement with the screws. These screws maye be standard bolts.

What I claim as my invention is:

A cable cutting tool comprising a bar jaw member restricted in transverse dimension for endwise insertion between the cable and any closely adjacent structure, a companion bar jaw member, each of said members having a central V-shaped cutter portion and opposite end portions apertured to be in alignment in the two bars, clamping screws for connecting said bars subsequent to the insertion of the first, said screws having threaded engagement with the apertures of the first bar and a shouldered engagement with the registering portions of the second bar, being adapted for forcibly drawing said bars together with apices of the V portions therein in substantial contact, such relative movement alone severing the cable.

References Cited in the file of this patent

UNITED STATES PATENTS

| Number | Name | Date |
|---|---|---|
| 870,441 | Kerr | Nov. 5, 1907 |
| 1,297,075 | Braley | Mar. 11, 1919 |
| 1,419,789 | Webb | June 13, 1922 |
| 1,736,041 | Huff | Nov. 19, 1929 |
| 1,857,493 | Campaigne | May 10, 1932 |
| 2,184,114 | Carlsen | Dec. 19, 1939 |
| 2,189,341 | Dumont | Feb. 6, 1940 |